UNITED STATES PATENT OFFICE.

GERHARD NICOLAAS VIS, OF CUISE-LAMOTTE, FRANCE.

PROCESS OF OBTAINING AMMONIUM SULFATE.

1,152,245.  Specification of Letters Patent.  Patented Aug. 31, 1915.

No Drawing.  Application filed January 27, 1913.  Serial No. 744,559.

*To all whom it may concern:*

Be it known that I, GERHARD NICOLAAS VIS, a subject of the Queen of the Netherlands, of Cuise-Lamotte, Republic of France, and whose post-office address is Cuise-Lamotte, Oise, Republic of France, have invented a new and useful Process of Obtaining Ammonium Sulfate; and I do hereby declare that the following is a full, clear, and exact description of my invention, which will enable others skilled in the art to which it appertains to make and use the same.

In my specification Serial Number 631799 application filed June 7th, 1911, I have mentioned that ammonium carbonate in the solid state mixed with gypsum (hydrated sulfate of calcium) with the addition of water—in a quantity which is not sufficient to dissolve the amount of ammonium sulfate corresponding to the ammonium carbonate—is entirely converted into ammonium sulfate if the amount of gypsum present is sufficient. On the other hand I have mentioned that this conversion in an aqueous solution occurs at any temperature, even if the solution is saturated with ammonium sulfate. On this basis the process may be carried out very advantageously in the following manner:—

Example: Gaseous ammonia is passed into a saturated solution of ammonium sulfate until 40 to 45 gr. of ammonia ($NH_3$) are taken up per liter, which taking up of the ammonia is ascertained by means of titration, after which carbonic acid is passed into the liquid, and care is taken that any ammonia that may have been carried away is retained in an absorption vessel. When passing carbonic acid into the liquid it is of advantage to cool same, so that the temperature remains below 25°, because although the quantity of ammonium carbonate per liter is not considerable, yet this substance is sufficiently volatile to cause appreciable losses when this precaution is not observed. Carbonic acid is introduced under continuous stirring, until all the ammonia has been converted into carbonate, which can be easily ascertained by determination of the carbonic acid in a measured quantity of the liquid. It will of course be obvious that the ammonia gas and the carbonic acid can be introduced simultaneously. After this the quantity of gypsum corresponding to the amount of ammonia is added in a finely powdered condition, taking notice of the fact that 5 gr. of ammonia per liter of liquid are not converted; this is done in order not to unduly protract the reaction. If, therefore, at the outset 5 cubic meters of saturated ammonium sulfate solution was employed into which was passed 45 gr. of ammonia per liter, 1060 kilograms of ground gypsum (of 95 per cent. $CaSO_4+2H_2O$) are added and the mixture is gradually heated under continuous stirring to 40°, which temperature is kept constant for 5 to 6 hours. It will then be found that up to about 5 gr. of ammonia (in the form of carbonate) remain unconverted per liter, while the greater part of the ammonium sulfate formed together with calcium carbonate remains undissolved. The liquid is then heated almost to boiling point and filtered. From the filtrate on cooling about 600 kilograms of pure ammonium sulfate is separated, which need only be drained and dried in order to give a first class article of commerce.

The calcium carbonate is washed out with hot water and the wash waters are concentrated for crystallization. The mother-liquor filtered off from the ammonium sulfate is used over again to be treated with ammonia gas and carbonic acid.

Having fully described my invention, what I desire to claim, and secure by Letters Patent of the United States, is:—

The method of manufacturing ammonium sulfate consisting in preparing a concentrated solution of ammonium sulfate, passing gaseous ammonia and carbonic acid in equivalent quantities into said saturation, converting the ammonium carbonate formed by means of calcium sulfate, bringing the ammonium sulfate formed thereby into solution by raising the temperature, and separating the crystallized ammonium sulfate from the solution and the calcium carbonate, and using the mother-liquid over again in repeating the process, substantially as described.

In testimony whereof I have hereunto set my hand in presence of two subscribing witnesses.

GERHARD NICOLAAS VIS.

Witnesses:
 ADRIEN CATALA,
 THEO. GLEUCK.

Copies of this patent may be obtained for five cents each, by addressing the "Commissioner of Patents, Washington, D. C."